(12) United States Patent
Kumar

(10) Patent No.: US 10,089,700 B2
(45) Date of Patent: *Oct. 2, 2018

(54) METHOD AND SYSTEM FOR VIEWING A CONTACT NETWORK FEED IN A BUSINESS DIRECTORY ENVIRONMENT

(71) Applicant: salesforce.com, inc., San Francisco, CA (US)

(72) Inventor: Seema Kumar, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/130,286

(22) Filed: Apr. 15, 2016

(65) Prior Publication Data

US 2016/0232618 A1    Aug. 11, 2016

Related U.S. Application Data

(63) Continuation of application No. 13/558,577, filed on Jul. 26, 2012, now Pat. No. 9,325,750.

(Continued)

(51) Int. Cl.
*G06F 15/16* (2006.01)
*G06Q 50/00* (2012.01)
(Continued)

(52) U.S. Cl.
CPC ....... *G06Q 50/01* (2013.01); *G06F 17/30528* (2013.01); *G06F 17/30867* (2013.01);
(Continued)

(58) Field of Classification Search
CPC .................................. G06F 17/30867
See application file for complete search history.

(56) References Cited

U.S. PATENT DOCUMENTS 5,577,188 A    11/1996  Zhu
5,608,872 A     3/1997  Schwartz
(Continued)

OTHER PUBLICATIONS

Saba, "Saba Announces Revolutionary Social Enterprise Platform," Press Release, Mar. 20, 2012, pp. 1-4, Redwood Shores, California.

(Continued)

*Primary Examiner* — Hieu Hoang
(74) *Attorney, Agent, or Firm* — Dergosits & Noah LLP; Todd A. Noah

(57) ABSTRACT

Systems and methods are provided for viewing a contact network feed in a business directory environment. A system searches, based on a user specified search, a business directory to determine contacts, identifies network feeds associated with the contacts, and outputs the network feeds. For example, the system outputs network feeds from data center managers identified by the business directory. The system filters, based on a user specified filter, the network feeds to determine filtered network feeds, and outputs the filtered network feeds to a display device. For example, the system outputs the network feeds from data center managers that mention a specific product. The system can enable communication with a contact using contact information from the business directory. The system can subscribe a user to the network feed of a contact, wherein the user receives updates for the network feed of the contact via a feed to a display device.

20 Claims, 4 Drawing Sheets

Related U.S. Application Data

(60) Provisional application No. 61/511,763, filed on Jul. 26, 2011.

(51) Int. Cl.
*H04L 29/06* (2006.01)
*G06F 17/30* (2006.01)
*G06Q 10/06* (2012.01)
*H04L 12/58* (2006.01)

(52) U.S. Cl.
CPC ............ *G06Q 10/06* (2013.01); *H04L 51/32* (2013.01); *H04L 65/403* (2013.01); *H04L 65/1063* (2013.01)

(56) References Cited

U.S. PATENT DOCUMENTS

| | | |
|---|---|---|
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,523,021 B1 | 2/2003 | Monberg et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,406,501 B2 | 7/2008 | Szeto et al. |
| 7,412,455 B2 | 8/2008 | Dillon |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,702,675 B1 * | 4/2010 | Khosla ............... G06F 17/30884 707/710 |
| 7,747,648 B1 | 6/2010 | Kraft et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,209,308 B2 | 6/2012 | Jakobson et al. |
| 8,275,836 B2 | 9/2012 | Beaven et al. |
| 8,473,503 B2 | 6/2013 | Cheng et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,572,129 B1 | 10/2013 | Lee et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |

(56) References Cited

U.S. PATENT DOCUMENTS

| | | |
|---|---|---|
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0091272 A1 | 4/2005 | Smith et al. |
| 2006/0173985 A1 | 8/2006 | Moore |
| 2008/0249972 A1 | 10/2008 | Dillon |
| 2008/0313277 A1 | 12/2008 | Altberg et al. |
| 2009/0100342 A1 | 4/2009 | Jakobson |
| 2010/0192054 A1* | 7/2010 | Nauerz ............ G06F 17/241 715/234 |
| 2010/0306249 A1 | 12/2010 | Hill et al. |
| 2011/0026692 A1* | 2/2011 | Sharp ............... H04W 68/08 379/88.23 |
| 2011/0047479 A1 | 2/2011 | Glosh |
| 2011/0196855 A1 | 11/2011 | Wable et al. |
| 2011/0302152 A1 | 12/2011 | Boyd et al. |
| 2012/0036137 A1 | 2/2012 | Naidu et al. |
| 2012/0158715 A1 | 6/2012 | Maghoul et al. |
| 2012/0185472 A1 | 7/2012 | Ahmed et al. |
| 2012/0233137 A1 | 9/2012 | Jakobson et al. |
| 2012/0323627 A1 | 12/2012 | Herring, Jr. et al. |
| 2013/0018900 A1 | 1/2013 | Cheng et al. |
| 2013/0036114 A1 | 2/2013 | Wong et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0129942 A1 | 5/2014 | Rathod |
| 2014/0359537 A1 | 12/2014 | Jakobson |
| 2015/0006289 A1 | 1/2015 | Jakobson |
| 2015/0007050 A1 | 1/2015 | Jakobson |
| 2015/0095162 A1 | 4/2015 | Jakobson |
| 2015/0172563 A1 | 6/2015 | Jakobson et al. |

OTHER PUBLICATIONS

U.S. Appl. No. 13/986,251, filed Apr. 16, 2013.
Office Action for U.S. Appl. No. 13/558,577; dated Sep. 2, 2015.
Office Action for U.S. Appl. No. 13/558,577; dated May 7, 2015.

* cited by examiner

METHOD AND SYSTEM FOR VIEWING A CONTACT NETWORK FEED IN A BUSINESS DIRECTORY ENVIRONMENT

CLAIM OF PRIORITY

This application is a continuation of U.S. application Ser. No. 13/558,577, filed Jul. 26, 2012, now U.S. Pat. No. 9,325,750, which claims the benefit of U.S. Provisional Patent Application 61/524,935, filed Jul. 26, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to a network feed in a business directory environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A social networking service is an online service, platform, or site that focuses on facilitating the building of social networks or social relations among people who may share interests, activities, real-life connections, or backgrounds, such as similar employment positions. A social network service consists of a representation or profile for each user, his/her social links, and a variety of additional services. Most social network services are web-based and provide means for users to interact over the Internet, such as e-mail and instant messaging. Social networking sites allow users to share ideas, activities, events, and interests within their individual networks. Popular social networking services include Facebook™, Google+™, and Twitter™, which are widely used worldwide.

Social network communications, or network feeds, include a wealth of information that businesses might be able to use for business development, lead generation, lead nurturing, and/or marketing. Since many social network services exist, some with millions of network feeds, sorting through network feeds to identify potentially helpful business information is a challenge. Even if a business developer has the time and the technology to identify potentially helpful business information communicated in the millions of network feeds, the business developer might not be able to determine the correct identities of the social network users who communicated the potentially helpful business information because many social networks enable their users to specify their own identities. For example, if a social network user who communicates potentially helpful business information uses a profile identified by "Sales Molly 66," a business developer may not be able to identify the individual who communicated this information, much less determine whether or not this individual is employed by a prospective client for the business developer's products and/or services. Lacking such information, the business developer's attempts to respond to network feeds might result in a significant waste of time and effort, as most responses may be sent to individuals who are in no position to authorize the purchase of the business developer's products and/or services. Accordingly, it is desirable to provide techniques enabling a database system monitoring network feeds to improve the performance, efficiency, and the ease of use for business development, lead generation, lead nurturing, and/or marketing.

BRIEF SUMMARY

In accordance with embodiments, there are provided systems and methods for viewing a contact network feed in a business directory environment. These systems and methods search, based on a user specified search, a business directory to determine contacts, identify network feeds associated with the contacts, and output the network feeds. Rather than attempting to identify potentially useful business information in millions of network feeds from anonymous social network users, a system user receives only the network feeds for the individuals that the system user identified from a business directory. For example, a system outputs only the network feeds from the individuals identified as data center managers in the business directory.

The systems and methods filter, based on a user specified filter, the network feeds to determine filtered network feeds, and output the filtered network feeds to a display device. Rather than having to read an incredible amount of network feeds from the limited number of individuals that the system user selected from the business directory, the system user may specify a filter to significantly reduce the number of network feeds displayed to the system user. For example, a system outputs the network feeds from the data center managers that mention a competitor's specific product.

The systems and methods can enable communication with a contact using contact information from the business directory. For example, a system user can contact a social network user whose network feed mentioned displeasure with a competitor's product, using the contact information that the social network user provided to the business directory.

The systems and methods can enable a system user to subscribe to the network feed of a contact, so the system user receives updates for the network feed of the contact via a feed to a display device. Even if a social network user's current network feeds do not indicate a direct interest in the system user's product, the system user can follow the social network user through the network feeds, monitoring comments that may indicate an interest in the system user's products and/or services. Accordingly, systems and methods are provided that enable a database system to monitor network feeds to improve the performance, efficiency, and the ease of use for business development, lead generation, lead nurturing, and/or marketing.

While one or more implementations and techniques are described with reference to an embodiment in which viewing a contact network feed in a business directory environment is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for viewing a contact network feed in a business directory environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for viewing a contact network feed in a business directory environment will be described with reference to example embodiments.

The following detailed description will first describe a method for searching a business directory to determine contacts, identifying network feeds associated with the contacts, outputting the network feeds, filtering the network feeds to determine filtered network feeds, and outputting the filtered network feeds to a display device. Next, a screen shot illustrating a frame of an example user interface screen is described.

Figure 1:
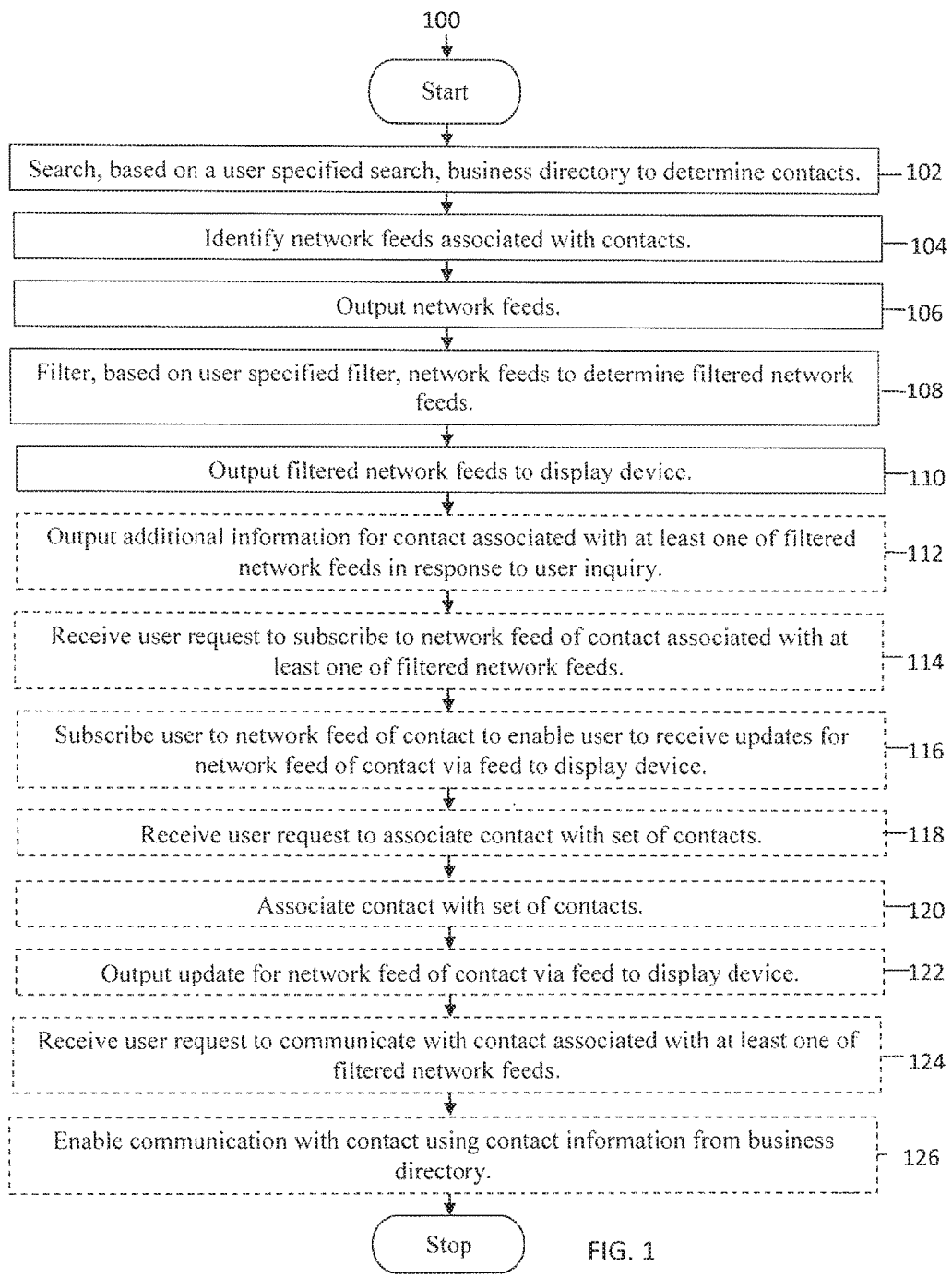
FIG. 1 is an operational flow diagram illustrating a high level overview of a method for viewing a contact network feed in a business directory environment in an embodiment.

FIG. 1 is an operational flow diagram illustrating a high level overview of a method 100 for viewing a contact network feed in a business directory environment in an embodiment. As shown in FIG. 1, a database system can enable a system user to create a filtered set of network feeds that each mention the system user's term(s) of interest and are from the social network users who the system user specifically identified.

In block 102, a business directory is searched, based on a user specified search, to determine contacts. For example and without limitation, this can include the database system searching a business directory for each individual matching the job title of "data canter manager," as specified by a system user. The user specified search may specify at least one of a role associated with an organization, an organization name, and an organization type. For example, the user can specify searches based on job titles, company names, company types, and/or any combination of these searches. The business directory may include a user generated database for the business directory, such as salesforce.com's data.com. The role associated with an organization may be based at least in part on a determination made by an algorithm associated with a business directory. For example, data.com may assign the role "data center manager" to different individuals with different titles in different organizations based on an analysis of each organization's hierarchy of job titles.

In block 104, network feeds associated with contacts are identified. By way of example and without limitation, this can include the database system identifying network feeds from 2,200 individuals listed in data.com as data center managers. The network feeds may be associated with at least one of an online social networking service and a microblogging service, such as Twitter, Inc.'s twitter. Identifying one of the network feeds associated with one of the contacts may be based on an identifier associated with the one of the contacts by the business directory and associated with the one of the network feeds. For example, data.com may list a data center manager named Don Whistle and Don Whistle's twitter identifier of "the whistledon," which enables the database system to identify Don Whistle's twitter communications, or tweets, as Don Whistle's. The database system may also identify network feeds for contacts in other ways, such as analyzing the internet protocol addresses used for communications.

In block 106, network feeds are output. In embodiments, this can include the database system outputting the tweets for the 2,200 data center managers identified by data.com. Rather than attempting to identify potentially useful business information in millions of network feeds from anonymous social network users, a system user receives only the network feeds for the individuals that the system user identified from a business directory.

In block 108, network feeds are filtered, based on user specified filter, to determine filtered network feeds. For example and without limitation, this can include the database system filtering the tweets from the 2,200 data center managers for the system user's competitor, a company named VML.

In block 110, filtered network feeds are output to a display device. By way of example and without limitation, this can include the database system outputting the data center managers' tweets that mention VML to the system user's mobile phone. Rather than having to read all of the network feeds from the limited number of individuals that the system user selected from the business directory, the system user may specify a filter that the database system uses to significantly reduce the number of network feeds displayed to the system user. The display device may be a handheld computing device, a mobile phone, a laptop computer, a work station, and/or a similar communication device.

In block 112, additional information for a contact associated with at least one of filtered network feeds is optionally output in response to a user inquiry. In embodiments, this can include the database system outputting additional information about Don Whistle and his employer because the system user used the user interface of her mobile phone to hover over Don Whistle's tweet about VML.

In block 114, a user request to subscribe to a network feed of a contact associated with at least one of filtered network feeds is optionally received. For example and without limitation, this can include the database system receiving the system user's request to become a follower of Don Whistle on twitter.

In block 116, a user is optionally subscribed to a network feed of a contact to enable the user to receive updates for the network feed of the contact via a feed to a display device. By way of example and without limitation, this can include the database system enabling the system user to subscribe to follow Don Whistle on twitter, which enables the system user to receive tweets from "thewhistledon" on her mobile phone. Subscribing a user to the network feed of the contact may include authorizing the business directory to receive the network feed of the contact. For example, the system user gives authorization to her data.com account to use her twitter account, she signs on to twitter, and follows Don Whistle on twitter.

In block 118, a user request is optionally received to associate a contact with a set of contacts. In embodiments, this can include the database system receiving a system user's request to add Don Whistle to the data.com group that she created for "prospects to watch." An example of another data.com group may be "accounts to watch," which may be a group for organizations rather than individuals.

In block 120, a contact is optionally associated with a set of contacts. For example and without limitation, this can include the database system adding Don Whistle to the system user's group "prospects to watch." Whenever the system user selects from an activation object labeled "prospects to watch," the database system may output a list of the contacts in the group and/or the most recent network feeds from members of the group.

In block 122, an update for a network feed of a contact is optionally output via a feed to a display device. By way of example and without limitation, this can include the database system outputting Don Whistle's subsequent tweets to the system user's mobile phone.

In block 124, a user request is optionally received to communicate with a contact associated with at least one of the filtered network feeds. In embodiments, this can include the database system receiving a system user's request to communicate with Don Whistle, which was prompted by Don Whistle's tweet about desiring a data center monitoring tool that is less expensive than VML's data center monitoring tool. Receiving the user request to communicate with the contact may include acquiring contact information from the business directory based on at least one of a subscription, a payment, and a credit based upon contributing information to the business directory. For example, the system user may access Don Whistle's email address because she is a subscriber to data.com, such that she can access a certain number of business contacts due to her subscription.

In block 126, communication with a contact is optionally enabled using contact information from a business directory. For example and without limitation, this can include the database system providing Don Whistle's email address to the system user's mobile phone, which enables her to send Don Whistle an email about her company's data center monitoring tool, mentioning Don Whistle's tweet in her email.

The method 100 may be repeated as desired. For example, the system user may use the database system to prepare a response to Don Whistle's subsequent reply to her email. The system user may locate the company page for Don Whistle's employer, and request to view the tweets from the company's employees. Since the tweets from the company's employees indicate that some employees will be attending a exposition the following month, the system user may respond to Don Whistle's email by proposing to demonstrate her data center monitoring tool to Don Whistle at the exposition.

Although this disclosure describes the blocks 102-126 executing in a particular order, the blocks 102-126 may be executed in a different order.

Figure 2:
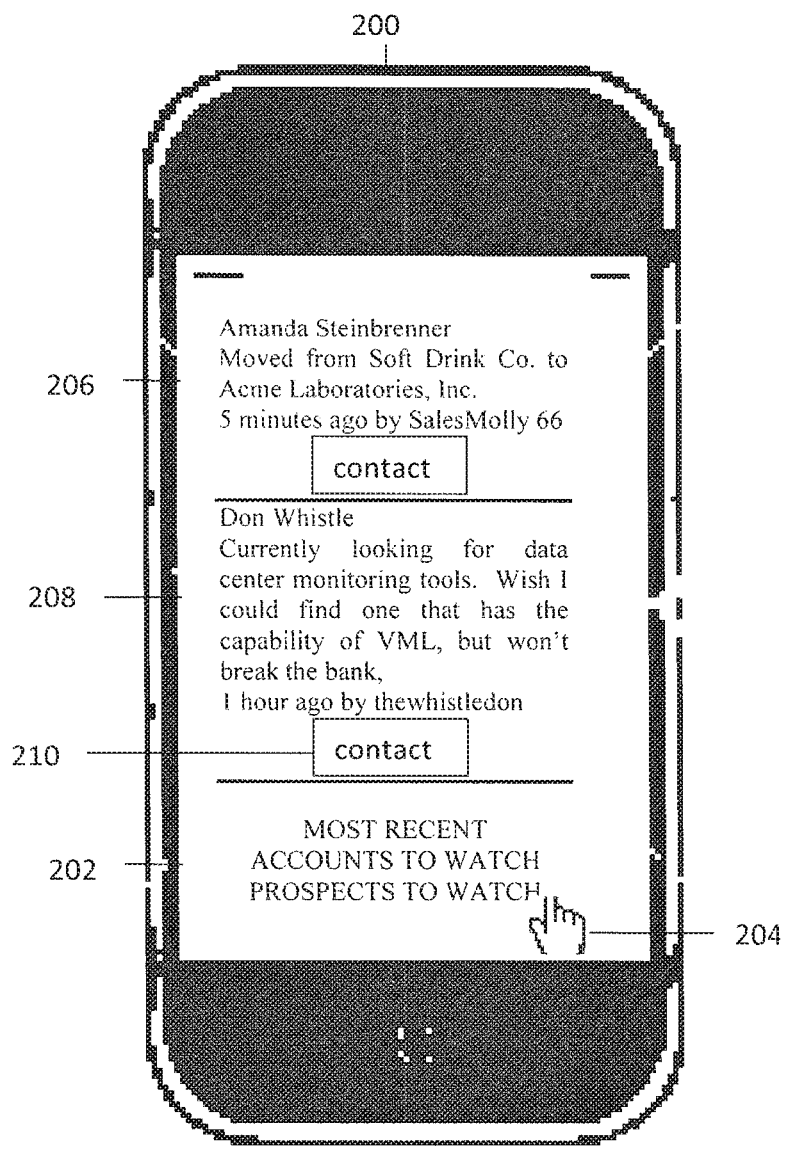
FIG. 2 is a screen shot illustrating a frame of an example user interface screen of a display device supporting methods for viewing a network feed in a business directory environment.

FIG. 2 is a screen shot illustrating a frame 202 of an example user interface screen of a display device 200 for viewing a contact network feed in a business directory environment in an embodiment. The frame 202 may include a selection icon 204, a first feed 206 section, a second feed 208 section, and an activation object 210.

The selection icon 204 enables the user to select from options depicted by the frame 202. The user may select from options that display contact network feeds, such as "most recent," "accounts to watch," and "prospects to watch." In this example, the system user selects to view network feeds from contacts that are in the group identified as "prospects to watch."

The first feed 206 section lists a recent feed based on the option selected by the user for displaying feeds. For example, the first feed 206 section depicts a tweet from "SalesMolly 66," who data.com has identified as Amanda Steinbrenner, an employee at Soft Drink Co.

The second feed 208 section lists another recent feed based on the option selected by the user for displaying feeds. For example, the second feed 208 section depicts a tweet from "thewhistledon," who data.com has identified as Don Whistle.

The contact 210 activation object in the second feed 208 section offers a system user an option to communicate with a contact. For example, the system user may select the contact 210 activation object to email Don Whistle after reading Don Whistle's tweet about desiring a data center monitoring tool that is less expensive than VML's data center monitoring tool.

The frame 202 may be part of a larger display screen that includes fields for users to enter commands to create, retrieve, edit, and store records. The database system may output a display screen that includes the frame 202 in response to a search based on search criteria input via a user interface.

Because the frame 202 is a sample, the frame 202 could vary greatly in appearance. For example, the relative sizes and positioning of the text is not important to the practice of the present disclosure. The frame 202 can be depicted by any visual display, but is preferably depicted by a computer screen. The frame 202 could also be output as a report and printed or saved in electronic format, such as PDF. The frame 202 can be part of a personal computer system and/or a network, and operated from system data received by the network, and/or on the Internet. The frame 200 may be navigable by a user. Typically, a user can employ a touch screen input or a mouse input device to point-and-click to a location on the frame 202 to manage the text on the frame 202, such as a selection that enables a user to edit the text. Alternately, a user can employ directional indicators, or other input devices such as a keyboard. The text depicted by the frame 202 is an example, as the frame 202 may include a much greater amount of text. The frame 202 may also include fields in which a user can input textual information.

System Overview

Figure 3:
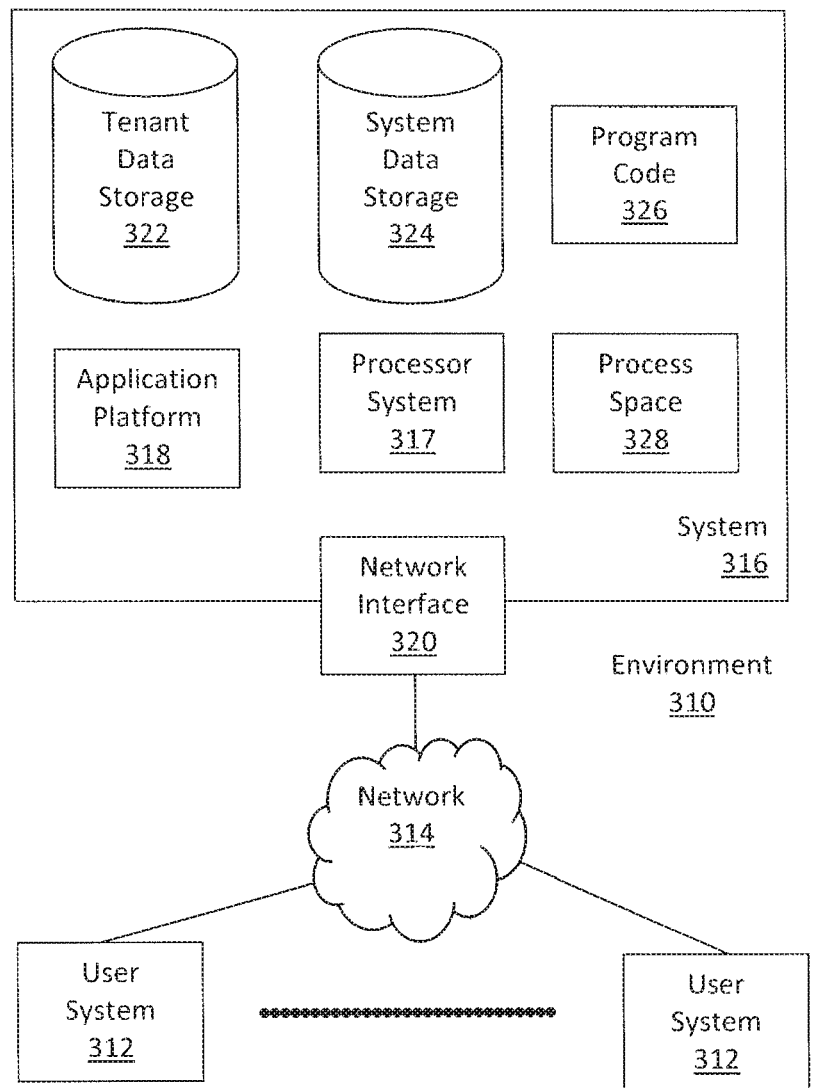
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 4:
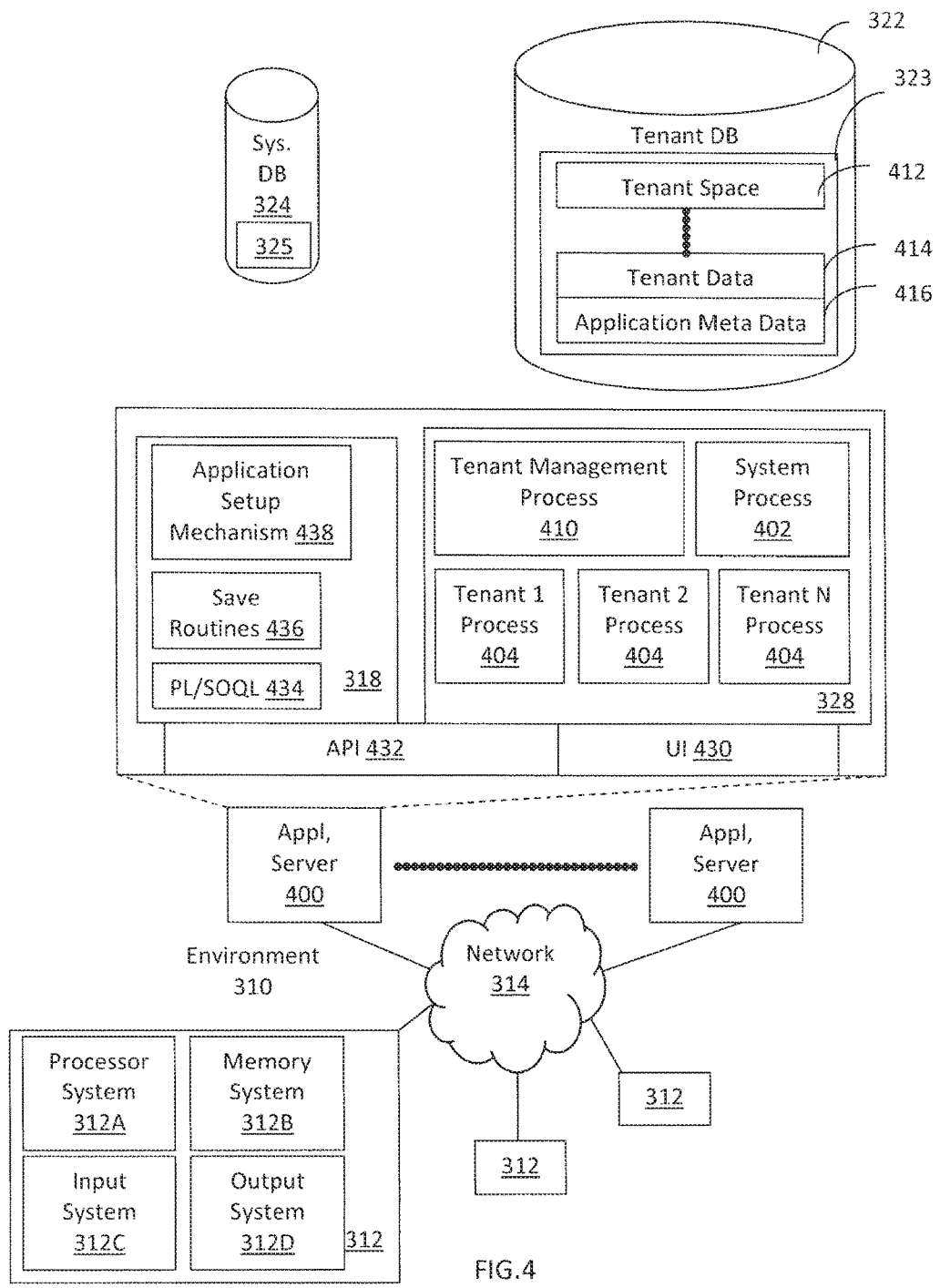
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $1000_1$-$1000_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 1000 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product comprising a non-transitory computer-readable medium having computer-readable program code embodied therein to be executed by one or more processors, the program code including instructions to:
   search, based on a user specified search, a business directory in a database system to determine at least one contact name;
   identify network feeds associated with the at least one contact name determined by the search of the business directory in the database system, wherein identifying one of the network feeds associated with the at least one contact name is based on an identifier associated with the at least one contact name by the business directory and associated with the one of the network feeds, wherein the identifier is different than the at least one contact name;
   output the network feeds;
   filter, based on a user specified filter, the network feeds to determine filtered network feeds; and
   output the filtered network feeds to a display device.

2. The computer program product of claim 1, wherein the user specified search specifies at least one of a role associated with an organization, an organization name, and an organization type.

3. The computer program product of claim 2, wherein the role associated with an organization is based at least in part on a determination made by an algorithm associated with the business directory.

4. The computer program product of claim 1, wherein the business directory comprises a user generated database for the business directory.

5. The computer program product of claim 1, wherein the network feeds are associated with at least one of an online social networking service and a micro-blogging service.

6. The computer program product of claim 5, wherein the network feeds are associated with an online social network made up of short messages.

7. The computer program product of claim 1, wherein the program instructions further includes instructions to output additional information for a contact associated with at least one of the filtered network feeds in response to a user inquiry.

8. The computer program product of claim 1, wherein the program instructions further includes instructions to:
   receive a user request to communicate with a contact associated with at least one of the filtered network feeds;
   enable communication with the contact using contact information from the business directory.

9. The computer program product of claim 1, wherein the program instructions further includes instructions to:
   receive a user request to subscribe to a network feed of a contact associated with at least one of the filtered network feeds; and
   subscribe a user to the network feed of the contact, wherein the user receives updates for the network feed of the contact via a feed to the display device.

10. The computer program product of claim 1, wherein the program instructions for receiving the user request to communicate with the contact comprise instructions to acquire contact information from the business directory based on at least one of a subscription, a payment, and a credit based upon contributing information to the business directory.

11. The method of claim 1, further comprising:
   receiving a user request to subscribe to a network feed of a contact associated with at least one of the filtered network feeds; and
   subscribing a user to the network feed of the contact, wherein the user receives updates for the network feed of the contact via a feed to the display device.

12. A method for viewing a contact network feed in a business directory environment, the method comprising:
   searching, based on a user specified search, a business directory in a database system to determine at least one contact name;
   identifying network feeds associated with the at least one contact name determined by the search of the business directory in the database system, wherein identifying one of the network feeds associated with the at least one contact name is based on an identifier associated with the at least one contact name by the business directory and associated with the one of the network feeds, wherein the identifier is different than the at least one contact name;
   outputting the network feeds;
   filtering, based on a user specified filter, the network feeds to determine filtered network feeds; and
   outputting the filtered network feeds to a display device.

13. The method of claim 12, wherein the user specified search specifies at least one of a role associated with an organization, an organization name, and an organization type.

14. The method of claim 13, wherein the role associated with an organization is based at least in part on a determination made by an algorithm associated with the business directory.

15. The method of claim 13, wherein receiving the user request to communicate with the contact comprises acquiring contact information from the business directory based on at least one of a subscription, a payment, and a credit based upon contributing information to the business directory.

16. The method of claim 12, wherein the business directory comprises a user generated database for the business directory.

17. The method of claim 12, wherein the network feeds are associated with at least one of an online social networking service and a micro-blogging service.

18. The method of claim 17, wherein the network feeds are associated with an online social network made up of short messages.

19. The method of claim 12, further comprising outputting additional information for a contact associated with at least one of the filtered network feeds in response to a user inquiry.

20. The method of claim 12, further comprising:
receiving a user request to communicate with a contact associated with at least one of the filtered network feeds;
enabling communication with the contact using contact information from the business directory.

* * * * *